(12) United States Patent
Mazyck et al.

(10) Patent No.: US 11,759,762 B2
(45) Date of Patent: *Sep. 19, 2023

(54) HIGH MECHANICAL STRENGTH SORBENT PRODUCT, SYSTEM, AND METHOD FOR CONTROLLING MULTIPLE POLLUTANTS FROM PROCESS GAS

(71) Applicant: Carbonxt, Inc., Gainesville, FL (US)

(72) Inventors: David W. Mazyck, Gainesville, FL (US); Heather McKenna, Portland, OR (US); Regina Rodriguez, Gainesville, FL (US); Christine Valcarce, Gainesville, FL (US)

(73) Assignee: Carbonxt, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,007

(22) Filed: Jan. 26, 2022

(65) Prior Publication Data
US 2022/0143573 A1 May 12, 2022

Related U.S. Application Data

(60) Division of application No. 16/672,845, filed on Nov. 4, 2019, now Pat. No. 11,266,974, which is a
(Continued)

(51) Int. Cl.
*B01D 53/04* (2006.01)
*B01J 20/20* (2006.01)
(Continued)

(52) U.S. Cl.
CPC .............. *B01J 20/20* (2013.01); *B01D 53/02* (2013.01); *B01D 53/0407* (2013.01);
(Continued)

(58) Field of Classification Search
CPC . B01J 20/20; B01J 20/041; B01J 20/06; B01J 20/103; B01J 20/12; B01J 20/24;
(Continued)

(56) References Cited

U.S. PATENT DOCUMENTS 3,533,961 A 10/1970 George et al.
3,538,020 A 11/1970 Heskett
(Continued)

FOREIGN PATENT DOCUMENTS

WO WO-2009032129 A2 * 3/2009 ............. B01D 53/02

OTHER PUBLICATIONS

Yohe, G.R. Binding materials used in making pellets and briquettes. Illinois State Geological Survey, Ubrana, IL, 1964.

*Primary Examiner* — Frank M Lawrence, Jr.
(74) *Attorney, Agent, or Firm* — Berg Hill Greenleaf Ruscitti LLP

(57) ABSTRACT

A sorbent product, including from about 1 wt % to about 99 wt %, based on the total weight of the sorbent product, of at least one base sorbent material; and from about 1 wt % to about 99 wt %, based on the total weight of the sorbent product, of at least one binder. The sorbent product may further include at least from about 0 wt % to about 99% wt %, based on the total weight of the sorbent product, of at least one additional additive. Methods for making same and methods and systems for controlling multiple pollutants are also included.

16 Claims, 5 Drawing Sheets

Related U.S. Application Data continuation of application No. 14/793,595, filed on Jul. 7, 2015, now Pat. No. 10,464,043.

(51) Int. Cl.

| | | |
|---|---|---|
| *B01J 20/12* | (2006.01) | |
| *B01J 20/06* | (2006.01) | |
| *B01J 20/10* | (2006.01) | |
| *B01J 20/04* | (2006.01) | |
| *B01J 20/24* | (2006.01) | |
| *B01J 20/28* | (2006.01) | |
| *B01J 20/30* | (2006.01) | |
| *B01J 20/32* | (2006.01) | |
| *B01D 53/50* | (2006.01) | |
| *B01D 53/02* | (2006.01) | |
| *B01D 53/56* | (2006.01) | |
| *B01D 53/64* | (2006.01) | |

(52) U.S. Cl.
CPC ......... *B01D 53/508* (2013.01); *B01D 53/565* (2013.01); *B01D 53/64* (2013.01); *B01J 20/041* (2013.01); *B01J 20/06* (2013.01); *B01J 20/103* (2013.01); *B01J 20/12* (2013.01); *B01J 20/24* (2013.01); *B01J 20/2803* (2013.01); *B01J 20/28059* (2013.01); *B01J 20/28061* (2013.01); *B01J 20/28064* (2013.01); *B01J 20/28066* (2013.01); *B01J 20/28083* (2013.01); *B01J 20/3007* (2013.01); *B01J 20/3042* (2013.01); *B01J 20/324* (2013.01); *B01D 2253/102* (2013.01); *B01D 2253/106* (2013.01); *B01D 2253/1124* (2013.01); *B01D 2253/306* (2013.01); *B01D 2253/308* (2013.01); *B01D 2253/311* (2013.01); *B01D 2257/302* (2013.01); *B01D 2257/40* (2013.01); *B01D 2257/404* (2013.01); *B01D 2257/602* (2013.01); *B01D 2259/40083* (2013.01)

(58) Field of Classification Search
CPC .............. B01J 20/2803; B01J 20/28059; B01J 20/28061; B01J 20/28064; B01J 20/28066; B01J 20/28083; B01J 20/3007; B01J 20/3042; B01J 20/324; B01D 53/02; B01D 53/04; B01D 53/0407; B01D 53/508; B01D 53/565; B01D 53/64; B01D 2253/102; B01D 2253/106; B01D 2253/1124; B01D 2253/306; B01D 2253/308; B01D 2253/311; B01D 2257/302; B01D 2257/40; B01D 2257/404; B01D 2257/602; B01D 2259/40083
USPC .......................... 96/108; 502/400, 416–418
See application file for complete search history.

(56) References Cited

U.S. PATENT DOCUMENTS

| | | |
|---|---|---|
| 3,960,761 A | 6/1976 | Burger et al. |
| 4,677,086 A | 6/1987 | McCue et al. |
| 5,356,852 A | 10/1994 | DeLiso et al. |
| 5,376,609 A | 12/1994 | Guile |
| 5,389,325 A | 2/1995 | Bookbinder et al. |
| 5,488,021 A * | 1/1996 | DeLiso .............. B01J 20/28045 502/413 |
| 5,691,270 A | 11/1997 | Miller |
| 5,736,485 A | 4/1998 | Miller |
| 5,840,651 A | 11/1998 | Hanashita et al. |
| 5,863,858 A * | 1/1999 | Miller ................... C01B 32/384 502/411 |
| 6,573,212 B2 | 6/2003 | McCrae et al. |
| 6,579,347 B1 | 6/2003 | Wakita |
| 6,696,384 B2 | 2/2004 | McCrae et al. |
| 6,806,219 B2 | 10/2004 | Masini |
| 8,691,722 B2 | 4/2014 | Gadkaree |
| 10,464,043 B2 * | 11/2019 | Mazyck ............. B01J 20/28066 |
| 2003/0022787 A1 | 1/2003 | McCrae et al. |
| 2010/0196213 A1 | 8/2010 | Lutz |
| 2012/0118160 A1 | 5/2012 | Heffes |

* cited by examiner

HIGH MECHANICAL STRENGTH SORBENT PRODUCT, SYSTEM, AND METHOD FOR CONTROLLING MULTIPLE POLLUTANTS FROM PROCESS GAS

CROSS REFERENCE TO RELATED APPLICATION

This application is a divisional of U.S. application Ser. No. 16/672,845, filed Nov. 4, 2019; which is a continuation application of U.S. application Ser. No. 14/793,595, filed Jul. 7, 2015, the entireties of these related applications being incorporated herein by reference.

TECHNICAL FIELD OF THE INVENTION

This invention relates, in general, to controlling multiple pollutants from process gas and, in particular, to a high mechanical strength sorbent product, system, and method for controlling multiple pollutants from process gas.

BACKGROUND OF THE INVENTION

Without limiting the scope of the present invention, its background will be described in relation to a high mechanical strength sorbent product, system, and method for controlling multiple pollutants from process gas, as an example.

The United States continually strives for cleaner energy production to decrease the detrimental impacts to our environment. For coal-fired power plants in particular this is a challenge that involves implementation of various pollution control devices. Over the years, as regulations continue to tighten and include more contaminants of concern, novel technologies that can remove multiple pollutants simultaneously have become popularized.

Activated carbon is a well-known material commonly used for treatment of a multitude of pollutants from gas and liquid streams. Activated carbons continue to find new treatment applications across many industries. In coal-fired power application, activated carbons have most recently been used to remove mercury from flue gas streams for protection of the environment. In other process gases, activated carbons have been demonstrated to remove sulfur dioxide ($SO_2$) and volatile organic compounds (VOCs). Typically these applications involve using a specific activated carbon that has properties that are optimized for the particular pollutant. Certain characteristics that are ideal for one contaminant are not so for another. Therefore, the current state of art to control for various pollutants from process gas or flue gas is comprised of different targeted pollution control technologies to remove each pollutant individually.

For instance, using flue gas generated from coal-fired power production, nitrogen oxides (NOx), sulfur oxides ($SO_x$), and mercury are regulated pollutants that require specific pollution control equipment to remove them to permissible limits. A specific technology is applied for each pollutant removal. First, selective catalytic reactors (SCR) usually precede other technologies with the aim of accomplishing denitrification. The options for desulfurization include dry and wet scrubbing. Mercury is effectively controlled with injection of powdered sorbents subsequently removed by particulate control devices. Multi-pollutant control is much desired in an era of increasingly stringent environmental regulations.

Less known and applied, shaped activated carbon pellets have been installed in a fixed bed configuration to provide multipollutant control (to remove sulfur dioxide, sulfur trioxide, mercury, particulate matter and nitrogen oxides from flue gas in a ReACT™ System). Current techniques to produce shaped activated carbon pellets for this application involve several production steps and high temperature treatments that produce excessive emissions. U.S. Pat. No. 5,840,651 describes a method for the production of an activated coke with high activity for desulfurization and denitrification. The method of such prior art is comprised of blending coals with different caking properties; forming a mixture; oxidizing followed by carbonizing and followed by further oxidation. These oxidizing and carbonizing steps are performed at elevated temperatures to transform the base material with inherently low specific surface area and low activity into a sorbent material suitable for desulfurization and denitrification. Several formulations include organic binders such as phenolic resins (U.S. Pat. No. 5,736,485) but these also require high temperature (i.e. energy intensive) processing and emit hazardous air pollutants during production.

Other production methods for shaped activated carbon pellets have been developed using clay binders, which circumvent many emission concerns but still require high temperature processing. Where high strength of the shaped sorbent is required, adsorption capacity is typically lost. For example, when clay is used as a binder, increasing the clay fraction from 5 to 30% significantly increases hardness. However, adsorption of butane, as an example, steadily decreases with the increased fraction of clay (U.S. Pat. No. 5,488,021).

Lower temperature production methods thus developed from the prior art insufficiency use cellulosic binder materials (U.S. Patent Application Publication No. 2003/0022787). However, these materials do not exhibit stability in high temperature applications and therefore would not be suitable for use in many process gas applications. There remains a need to produce shaped activated carbon bodies that have improved strength under a multitude of operating conditions with high adsorption capacity and reactivity produced at a competitive cost.

SUMMARY OF THE INVENTION

The present invention disclosed herein is directed to a high mechanical strength sorbent product, system, and method for controlling multiple pollutants from process gas. In one embodiment, it is a high mechanical strength sorbent product capable of simultaneous removal of multiple pollutants from process gas and the process for the production thereof. In general, the process consists of blending one or more base sorbent materials with 1 or more binders, water, and additional additives as necessary; forming said mixture or alternatively coating said mixture onto a support material; and then drying the formed or coated material at low temperatures. The sorbent product may be powdered, granular, pelletized or coated onto a support material. Furthermore, the sorbent product may be housed in a packed bed through which the process gas may pass, injected into the gas, housed in a rotating system where the sorbent product circulates between contact with the gas and a sorbent regeneration system, or installed in a fixed location in the gas conduit system.

The sorbent product combines multiple components in order to (1) add high strength without production drawbacks such as high temperature treatment or by-product formation, and (2) provide improved multipollutant treatment capacity at reduced production costs. The high mechanical strength allows the sorbent product to be used in applications that require maintaining the original shape and integrity of the product. Such applications might include a moving fixed bed for either pollution control or regeneration. The sorbent product precursor materials, which were inventively combined to exhibit these qualities, will also require minimal processing time and energy.

Multipollutant control allows for several contaminants of concern to be treated simultaneously with one pollution control device in lieu of multiple single targeted treatment systems. This has significant advantages including the decreasing of capital cost, technology footprint, and waste streams.

In one embodiment, the present invention is directed to a sorbent product, including from about 1 wt % to about 99 wt %, based on the total weight of the sorbent product, of at least one base sorbent material; and from about 1 wt- to about 99 wt %, based on the total weight of the sorbent product, of at least one binder. In one aspect, the sorbent product may further include at least from about 0 wt % to about 99; wt %, based on the total weight of the sorbent product, of at least one additional additive.

In another aspect, the at least one base sorbent material may be at least one material selected from the group consisting of activated carbon, activated coke, activated charcoal, activated carbon fibers, biochars, chars, zeolites and other molecular sieves, silica sorbents, and polymethylsiloxane polyhydrate. In yet another aspect, the at least one base sorbent material may have a starting surface area of from about 10 to about 1,500 m$^2$/gram. Also, the at least one base sorbent material may have an average pore size less than 20 Å and less than 50% of the total pore volume is a fraction of mesopores as determined by the BJH method.

Additionally, the at least one base sorbent material is from about 15 wt % to about 85 wt %, based on the total weight of the sorbent product. Further, the at least one base sorbent material may be powdered activated carbon with a starting area of greater than 200 m$^2$/gram. In still yet another aspect, the at least one base sorbent material may be at least 50 wt % of the total sorbent product. Also, the at least one binder may be at least one material selected from the group consisting of alumina, aluminates, aluminum, aluminum phosphate, asphalt, attapulgite, bitumen, bentonite clay, borate glass, calcium chromites, calcium compounds, calcium fluoride, calcium germinate, calcium oxide, calcium sulfate, carboxymethlycellulose (CMC), casein, cellulose, cellulose ethers, cement, clay, colloidal silica, epoxy resin, flour, fly ash, fuller's earth, glycerol, guar gum, gums, iron humate, iron oxide, kaolin clay, laponite, lignosulfonates, lime, lime kiln dust, magnesium chloride, magnesium oxide, magnesium sulfate, metal carbides, metal carbonyls, metals, molasses, montmorillonite, natural or synthetic resin, nitrophenols, novalac phenolic resin, organosilicons, phenol resins, phenolic resin polymers, phosphoronitrile dichloride polymers, pickling liquors, pitch, polyacrylonitrile, polyester resins, Portland cement, potassium silicate, pulp mill wastewater, resin, sawdust, shellac, silica, silicates, silicides, silicon carbide, sodium silicate, starch, tar, wollastonite, and zinc compounds.

In another aspect, the at least one binder may include at least one material selected from the group consisting of clays, clay, bentonite clay, attapulgite, fuller's earth, kaolin clay, laponite, and wollastonite; and at least one material selected from the group consisting of colloidal silica, laponite, potassium silicate, silica, silicates, silicides, silicon carbide, and sodium silicate.

In still yet another aspect, the at least one binder may be from about 1 wt % to about 50 wt %, based on the total weight of the sorbent product. Additionally, the at least one binder creates a sorbent product that is thermally stable at temperatures up to 450° C. in the presence of water vapor. Also, the at least one additional additive may be at least one material selected from the group consisting of ammonia salts (ammonia chloride, ammonia sulfate, etc.), urea, acid, base, nitric acid, iron oxides, complex metal ions (i.e. Fe-EDTA, iron hydroxides, etc.), metal, metal oxide, alkaline earth, metal, sand, etc. In another aspect, the at least one additional additive may be from about 1 wt % to about 5 wt %, based on the total weight of the sorbent product.

In another embodiment, the present invention is directed to a method for making sorbent products, including providing a source of at least one base sorbent material; providing a source of at least one binder; providing a source of water; mixing the at least one base sorbent material, at least one binder, and water to produce a sorbent product mixture; forming the sorbent product mixture into at least one of a shape, form, and coating; and drying the at least one of the shape, form, and coating to produce the sorbent product. In one aspect, the method may further include providing a source of at least one additional additive. In another aspect, the mixing may include mixing the at least one additional additive. Still yet in another aspect, the mixing may include mixing together the dry compounds then adding and mixing the wet compounds to the dry compounds.

Also, the forming may include forming the sorbent product mixture into at least one shape selected from the group consisting of cylindrical, cubic, rectangular, and spherical. Additionally, the forming may include forming the sorbent product mixture into pellets. In another aspect, the drying may include drying the formed sorbent product at a temperature ranging from 60° C. to 250° C. Further, the forming may include coating the sorbent product mixture onto a substrate. In still yet another aspect, the water is from about 15 wt % to about 50 wt %, based on the total weight of the sorbent formula.

In yet another embodiment, the present invention is directed to a system for controlling multiple pollutants in a process gas, including a source of the process gas; and a pollutant control unit containing one or more sorbent products, the one or more sorbent products comprising from about 1 wt % to about 99 wt %, based on the total weight of the sorbent product, of at least one base sorbent material; and from about 1 wt % to about 99 wt %, based on the total weight of the sorbent product, of at least one binder.

In one aspect, the one or more sorbent products may further include at least from about 0 wt % to about 99% wt%, based on the total weight of the sorbent product, of at least one additional additive. Additionally, the pollutant control unit may be one or more units selected from the group consisting of a packed bed unit, a direct contact unit, a rotary contact unit, and a recycling unit. In yet another aspect, the system may further include a desorption unit for desorbing the multiple pollutants from the one or more sorbent products.

In still yet another embodiment, the present invention is directed to a method for controlling multiple pollutants in a process gas, including contacting the process gas with one or more sorbent product, the one or more sorbent product comprising from about 1 wt % to about 99 wt %, based on the total weight of the sorbent product, of at least one base sorbent material; and from about 1 wt % to about 99 wt %, based on the total weight of the sorbent product, of at least one binder. In one aspect, the one or more sorbent products may further include at least from about 0 wt to about 99% wt %, based on the total weight of the sorbent product, of at least one additional additive. In another aspect, the contacting may include flowing the process gas through a packed bed comprising the one or more sorbent products. In yet another aspect, the contacting may include injecting the one or more sorbent products into the process gas. In still yet another aspect, the method may further include desorbing the multiple pollutants from the one or more sorbent product; and recycling the one or more sorbent product for contacting the process gas.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1A:
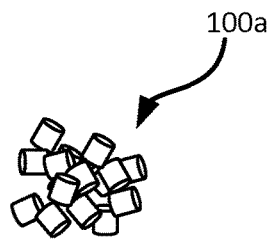
FIGS. 1A-1D are illustrations of sorbent products according to several embodiments.
Figure 1B:
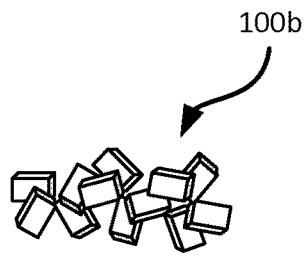
Figure 1C:
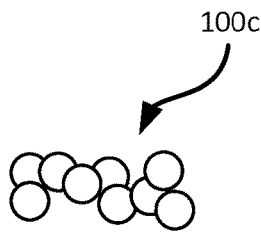
Figure 1D:
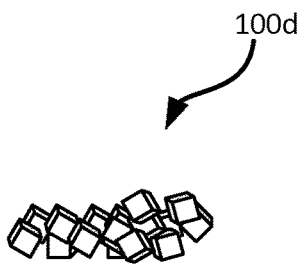

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not limit the scope of the present invention.

Referring initially to FIGS. 1A-1D, several embodiments of high mechanical strength sorbent products for multiple pollutants control from process gas are schematically illustrated and generally designated 100a-100d (collectively sorbent products 100). Sorbent products 100 may be powdered, granular, pelletized, and/or coated onto a substrate. Further, sorbent products 100 may be any shape, form, and the like. For example, sorbent products 100 may be a substantially cylindrical pelletized shape or form, such as sorbent product 100a.

In another example, sorbent products 100 may be a substantially rectangular shape or form, such as sorbent product 100b. In yet another example, sorbent products 100 may be a substantially spherical shape or form, such as sorbent product 100c. In still yet another example, sorbent products 100 may be a substantially cubic shape or form, such as sorbent product 100d.

Sorbent products 100 means a sorbent product capable of removing sulfur oxides ($SO_x$), nitrogen oxides ($NO_x$), and/or mercury (Hg) from a gas stream, such as flue gas, while meeting the following measurement of strength and integrity when produced: Roga Index greater than 95% measured using an apparatus as described in JIS M 8801.

Figure 2:
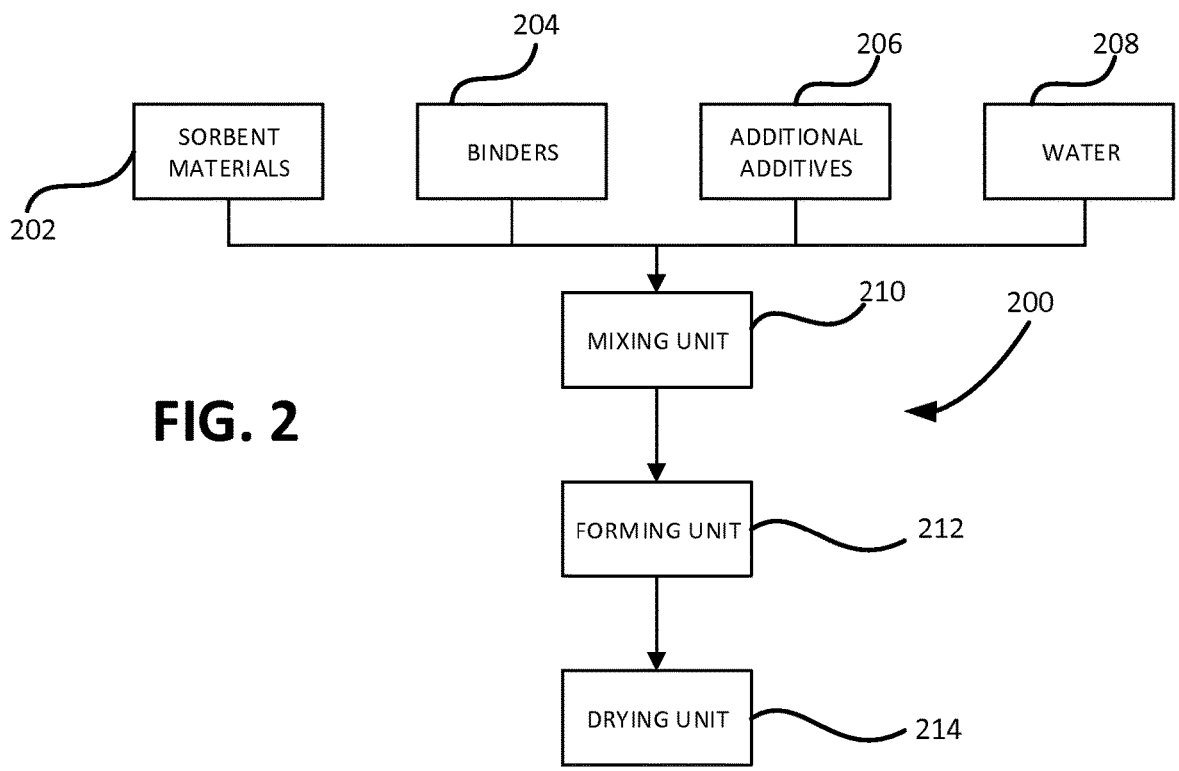
FIG. 2 is a block diagram of a system for making sorbent products according to an embodiment.

Turning now to FIG. 2, an embodiment of a system for making high mechanical strength sorbent products for multiple pollutants control from process gas is schematically illustrated and generally designated 200. System 200 includes a sorbent materials feedstock unit 202 that may be the source for storing and/or the initial feedstock unit for containing and providing a sorbent material to a mixing unit 210 of system 200. Sorbent materials feedstock unit 202 may contain one or more sorbent material feedstocks for providing to mixing unit 210 of system 200.

Sorbent materials feedstock unit 202 may contain one or more materials including activated carbon, activated coke, activated charcoal, activated carbon fibers, biochars, chars, zeolites and other molecular sieves, silica sorbents, polymethylsiloxane polyhydrate, etc. with a surface area of preferably 10-1500 square meters per gram ($m^2/g$) and average preferable pore size less than twenty Angstroms (20 Å) and less than 50% of the total pore volume is a fraction of mesopores as determined by the BJH method. In one embodiment, this microporous structure of the sorbent material feedstock enhances improved contacting and interaction between sorbent material feedstock and binders feedstock that allows for greater binding strength without sacrificing specific surface area of sorbent products 100.

System 200 may also include a binders feedstock unit 204 that may be the source for storing and/or the initial feedstock unit for containing and providing a binder material to mixing unit 210 of system 200. Binders feedstock unit 204 may contain one or more binders feedstocks for providing to mixing unit 210 of system 200.

Binders feedstock unit 204 may contain one or more materials including alumina, aluminates, aluminum, aluminum phosphate, asphalt, attapulgite, bitumen, bentonite clay, borate glass, calcium chromites, calcium compounds, calcium fluoride, calcium germinate, calcium oxide, calcium sulfate, carboxymethlycellulose (CMC), casein, cellulose, cellulose ethers, cement, clay, colloidal silica, epoxy resin, flour, fly ash, fuller's earth, glycerol, guar gum, gums, iron humate, iron oxide, kaolin clay, laponite, lignosulfonates, lime, lime kiln dust, magnesium chloride, magnesium oxide, magnesium sulfate, metal carbides, metal carbonyls, metals, molasses, montmorillonite, natural or synthetic resin, nitrophenols, novalac phenolic resin, organosilicons, phenol resins, phenolic resin polymers, phosphoronitrile dichloride polymers, pickling liquors, pitch, polyacrylonitrile, polyester resins, Portland cement, potassium silicate, pulp mill wastewater, resin, sawdust, shellac, silica, silicates, silicides, silicon carbide, sodium silicate, starch, tar, wollastonite, zinc compounds, etc.

Preferably, the selection of the materials of binders feedstock unit 204 materials is critical to establish high strength despite low drying temperatures that are superior to the prior art. For example, the use of a silica sol and a clay binder material provide a rigid backbone-like structure locking in activated carbon particles to create the rigid high mechanical strength. In this aspect, the silica sol undergoes polycondensation to form a strong silica bonded network due to the presence of multivalent cations present in the clay medium.

This network adds rigidity to the mixture without the need for high temperatures previously necessary for use of clay binders.

The combination of the materials of binders feedstock unit 204 also contributes to the pore morphology of sorbent products 100 to improve the multipollutant affinity. In one aspect, the materials of sorbent materials feedstock unit 202 may provide the largest fraction of the pore volume, the materials of binders feedstock unit 204 may provide additional adsorption sites and shape the transport pores to make the activated carbon adsorption sites accessible.

Also, system 200 may include an additional additives feedstock unit 206 that may be the source for storing and/or initial feedstock unit for containing and providing an additional additives to mixing unit 210 of system 200. Additional additives feedstock unit 206 may contain one or more materials that may be added as necessary to improve physical and chemical properties. For example, ammonia salts (ammonia chloride, ammonia sulfate, etc.), urea, acid, base, nitric acid, complex metal ions (i.e. Fe-EDTA, iron hydroxides, etc.), metal, metal oxide, alkaline earth metal, etc. may be added to the formula to improve denitrification and desulfurization. For certain applications that require greater density, iron oxides, sand, etc., may be added.

Additionally, system 200 may also include a water feedstock unit 208 that may be the source for storing and/or the initial feedstock unit for containing and providing water to mixing unit 210 of system 200.

The materials, compounds, and the like contained in sorbent materials feedstock unit 202, binders feedstock unit 204, additional additives feedstock unit 206, and/or water feedstock unit 208 may be fed into a mixing unit 210, in one embodiment. In one aspect, the materials, compounds, and the like in each one of the feedstock units may be fed directly into mixing unit 210. In another embodiment, they may first be fed into a manifold and the like and then fed together into mixing unit 210 as is commonly known to those skilled in the art. Mixing unit 210 mixes feedstocks 202, 204, 206, and/or 208 into a mixture for further processing in system 200.

Mixing unit 210 may provide for the mixing of the materials, compounds, and the like that are fed to it from feedstocks 202, 204, 206, and/or 208. In one embodiment, mixing unit 210 may be capable of mixing these materials, compounds, and the like from feedstocks 202, 204, 206, and/or 208 for any desirable amount of time.

In one embodiment, all of the dry feedstocks may be mixed first, and then the wet binders, water, etc. may be added to the dry mix to create a sorbent mixture.

System 200 may further include a forming unit 212 for receiving the mixed material from mixing unit 210 and for then forming the mixed material into a desired shape or form prior to drying as discussed below. Preferably, forming unit 212 forms or shapes the mixed material into cylindrical, spherical, square, or rectangular granules/pellets using an extruder, briquetting machine or pelletizer, as shown in FIGS. 1A-1D. In another embodiment, forming unit 212 may be a coating unit for coating a desired substrate with the mixed material from mixing unit 210. In one embodiment, forming unit 212 may be capable of forming said mixture material into cylindrical pellets through extrusion through a die and cutting the extruding material to produce pellets. In one embodiment, the extrusion device may be any size die, capable of producing the desirable sized pellets. For example, the die may be a 1-3 inch die having a desired number of holes for producing the desired pellets. In one example, the die may be a 2 inch having 6 holes for producing the desired pellets. Preferably, the pellets have a diameter of from about 2 mm to about 10 mm. More preferably, the pellets may have a diameter of from about 5 mm to about 10 mm. In one preferred embodiment, the pellets may have a diameter of approximately 9 mm.

System 200 may further include a drying unit 214 for drying the shaped, formed, coated, etc. material in a controlled temperature environment for a desired amount of time. For example, in one embodiment, drying conditions inside drying unit 214 may occur at temperatures of 60-250° C. with 110° C. as ideal. Furthermore, in one embodiment, drying conditions in drying unit 214 may occur using a waste heat source to further improve the economics and sustainable production of sorbent products 100. Some exemplary drying units 214 may include, but are not exclusive, to rotary kilns, vertical furnaces, any form of waste heat, UV, steam, etc. In one embodiment, drying unit 214 may be capable of drying the formed mixture material at a temperature of 110 C to a moisture content of less than 3.

Figure 3:
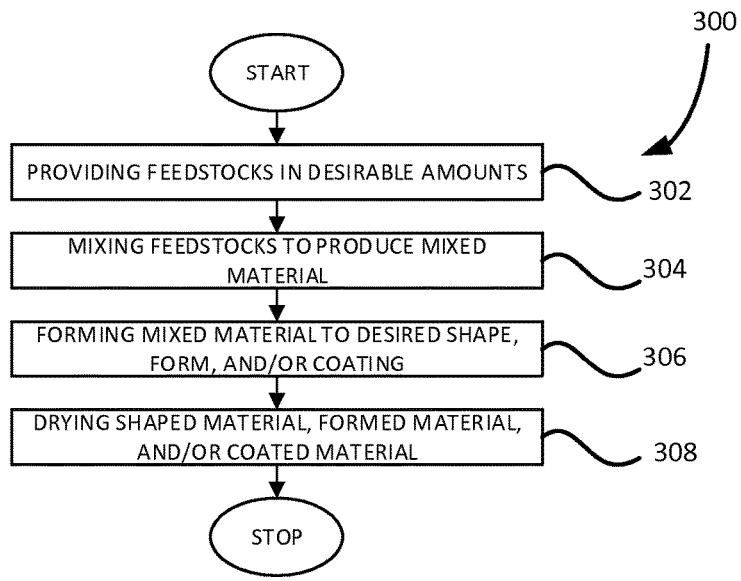
FIG. 3 is a flowchart of a process for making sorbent products according to an embodiment.

Referring now to FIG. 3, an embodiment of a method for making high mechanical strength sorbent products for multiple pollutants control from process gas is schematically illustrated and generally designated 300. In step 302, the raw materials from one or more feedstocks 202, 204, 206, and/or 208 are supplied, fed, provided, etc. to mixing unit 210. This step may include weighing, measuring, monitoring, etc. each of the one or more feedstocks 202, 204, 206, and/or 208 prior to or during feeding into mixing unit 210.

In step 304, the mixture material is mixed to a desired consistency for a desired period of time. In step 306, the mixed material may be fed, supplied, provided, etc. to forming unit 212 for forming into a desired shape, form, and/or coating. This step may include providing a desirable substrate upon which a coating may be applied. In step drying unit 308, the formed or coated material is then supplied, provided, etc. to drying unit 214 for drying. Although the above method is described with relation to system 200, the method may be performed in any unitary and/or modular units and devices as are commonly known to those skilled in the art.

Some exemplary formulations and process conditions for producing sorbent products 100 are provided as follows. In one embodiment, a combination of one or more base sorbent materials, such as supplied from sorbent materials feedstock unit 202, may be incorporated with each base sorbent material comprising 1-99 wt. % of the formula for preparing sorbent products 100. Ideally, the base sorbent material(s) will comprise no more than 85 wt. % of the formula and no less than 15 wt. % of the formula. In an ideal embodiment, the base sorbent material is powdered activated carbon with starting surface area greater than 200 m²/g and is at least 50 wt. % of the total weight of the sorbent products 100.

Also, any binder material suitable for the application, such as supplied from binders feedstock unit 204, may be used singularly or in combination with other binding materials with each binder used comprising 1-99 wt. % of the formula for a high mechanical strength sorbent product. Ideally, a given binder will comprise no more than 50 wt. % of the formula and no less than 1 wt. % of the formula. In one embodiment, no more than two binders are used, with each comprising about 1-25 wt. % of the formula. In another embodiment, the preferred binders create a sorbent product that is thermally stable at temperatures up to 450° C. in the presence of water vapor, thus maintaining the high mechanical strength of the sorbent product.

Further, additional additives, such as supplied from additional additives feedstock unit 206, each may comprise 0-99 wt. % of the formula. Ideally, additional additives will each comprise 5 wt. % of the total weight of the sorbent product. Additionally, in one embodiment, water may be added at 15-50 wt. % during the mixing of raw materials, such as when mixing in mixing unit 210.

The present sorbent products 100 are capable of simultaneous desulfurization (deSO$_x$), denitrification (deNO$_x$), and/or mercury (Hg) removal, and some generalized and specific examples are described below. It is noted however, that these examples represent improved results and the technical scope of the invention herein is not limited to the examples. In the following examples, the properties and performance of the sorbent product was measured by the following methods.

SO$_2$ adsorption capacity. The sorbent product was size reduced to less than 1.7 mm particles and approximately 2 grams placed in a quartz fixed bed reactor where it was exposed to the following simulated flue gas conditions: SO$_2$ at 20,000 ppm, O$_2$ at 5%, H$_2$O at 10% and N$_2$ as the balance. The flue gas was set to a temperature of 100° C. and passed through the sorbent product for 3 hours. Finally, a desorption step at a temperature of 400° C. was performed under an N$_2$ environment and the desorbed SO$_2$ was measured with a Fourier Transfer Infrared (FTIR) device.

deNO$_x$ efficiency. To determine the deNO$_x$ efficiency: 130 g of the sorbent product was placed in a quartz tube reactor where it was exposed to the following simulated flue gas conditions: NO at 200 ppm, O$_2$ at 5%, H$_2$O at 10%, NH$_3$ at 200 ppm and N$_2$ as the balance. The flue gas was set to a temperature of 130° C. and space velocity of 400 hr$^{-1}$. The NO concentration as measured by FTIR at the outlet after 50 hours was used to determine the percent deNO$_x$ efficiency.

Roga Index. To determine the Roga Index: 30 grams of the sorbent product with size greater than 6 mm was placed in an apparatus as described in JIS M 8801. The apparatus was set to rotate at 50 rpm for 1,000 revolutions after which the sample was sieved through a 6 mm mesh for 3 minutes. The Roga Index is the weight retained in the sieve divided by the weight of the sample.

In one embodiment, a generalized process and formulation for making sorbent products 100 may include: blending 1 or more base sorbent materials each constituting 1-99 wt. % of the formula with 1 or more binders each constituting 1-99 wt. % of the formula, additional additives as necessary to improve physical and chemical properties each constituting 0-99 wt. % and adding water constituting 0-99 wt. % of the formula. Mixing the blended raw materials to an even consistency for 1-30 minutes. Forming said mixture into cylindrical, spherical, square, or rectangular granules/pellets using an extruder, briquetting machine or pelletizer. Drying pellets at temperatures ranging from 60°-250° C. to a moisture content of 0-15% per ASTM method D2867.

In another embodiment, a generalized process and formulation for making sorbent products 100 may include: blending 1 or more base sorbent materials each constituting 1-99 wt. % of the formula with 1 or more binders each constituting 1-99 wt. % of the formula, additional additives as necessary to improve physical and chemical properties each constituting 0-99 wt. %, and adding water constituting 0-99 wt. % of the formula. Mixing the blended raw materials to an even consistency for 1-30 minutes. Coating said mixture onto a support material. Drying coated material at temperatures ranging from 60°-250° C. for duration sufficient enough to reach steady mass.

Some more specific exemplary formulations and processes for making sorbent products 100 are described below.

Example 1

A high mechanical strength sorbent product was made as follows: blending a powdered activated carbon with initial surface area of 750 m$^2$/g, average pore size of 22 Å, and 27% mesopore fraction as 42 wt. % of the formula with 11 wt. % bentonite and 4 wt. % iron oxide. Adding a 40 wt. % solution of colloidal silica as 19 wt. % of the formula and water constituting 24 wt. % of the formula, and then mixing for 5 minutes. Forming said mixture into 9 mm diameter cylindrical pellets through extrusion with a 6 hole, 2 inch dye and cutting the extruding material to produce pellets with 10 mm approximate length. Drying extruded pellets at a temperature of 110° C. to a moisture content of less than 3%. The resulting sorbent product 100 (Experiment 1 in Table 1) had a Roga index of 95%, SO$_2$ adsorption capacity of 90 mg/g, and deNO$_x$ efficiency of 17%.

Example 2

A high mechanical strength sorbent product was made as follows: blending a powdered activated carbon with initial surface area of 220 m$^2$/g, average pore size of 32 Å, and 55% mesopore fraction as 42 wt. % of the formula with 14 wt. % lime kiln dust. Adding a 40 wt. % solution of colloidal silica as 18 wt. % of the formula and water constituting 26 wt. % of the formula, and then mixing for 5 minutes. Forming said mixture into 9 mm diameter cylindrical pellets through extrusion with a 6 hole, 2 inch dye and cutting the extruding material to produce pellets with 10 mm approximate length. Drying extruded pellets at a temperature of 110° C. to a moisture content of less than 3%. The resulting sorbent product 100 (Experiment 2 in Table 1) had a Roga index of 93%, SO$_2$ adsorption capacity of 14 mg/g, and deNO$_x$ efficiency of 7%. This sorbent product exhibits lower SO$_2$ adsorption capacity and deNO$_x$ efficiency than the sorbent product in Example 1 due to the use of a base sorbent material with a large average pore size, which does not produce sufficient active sites for SO$_x$ adsorption and denitrification.

Example 3

A sorbent product with low mechanical strength was made as follows: blending a powdered activated carbon with initial surface area of 570 m$^2$/g, average pore size of 20 Å, and 20% mesopore fraction as 50 wt. % of the formula with 10 wt. % bentonite. Adding water constituting 40 wt. % of the formula, and then mixing for 5 minutes. Forming said mixture into 9 mm diameter cylindrical pellets through extrusion with a 6 hole, 2 inch dye and cutting the extruding material to produce pellets with 10 mm approximate length. Drying extruded pellets at a temperature of 110° C. to a moisture content of less than 3%. The resulting sorbent product 100 (Experiment 3 in Table 1) had a Roga index of 85%, thus producing insufficient mechanical strength due to lack of high temperature treatment as described in the prior art for shaped activated carbon pellets with clay binders.

Example 4

A sorbent product with low mechanical strength was made as follows: blending a powdered activated carbon with initial surface area of 220 m$^2$/g, average pore size of 32 Å, and 55% mesopore fraction as 50 wt. % of the formula with 10 wt. % bentonite. Adding water constituting 40 wt. % of the formula, and then mixing for 5 minutes. Forming said mixture into 9 mm diameter cylindrical pellets through extrusion with a 6 hole, 2 inch dye and cutting the extruding material to produce pellets with 10 mm approximate length. Drying extruded pellets at a temperature of 110° C. to a moisture content of less than 3%. The resulting sorbent product 100 (Experiment 4 in Table 1) had a Roga index of 65%, thus producing insufficient mechanical strength due to lack of high temperature treatment as described in the prior art for shaped activated carbon pellets with clay binders. Furthermore, the lack of sufficient micropores (pores less than 20 Å) contributed to a decrease in mechanical strength in comparison to Example 3.

Example 5

A sorbent product with low mechanical strength was made as follows: blending a powdered activated carbon with initial surface area of 220 m$^2$/g, average pore size of 32 Å, and 55:% mesopore fraction as 54 wt. % of the formula with 3 wt. % bentonite and 3 wt. % starch. Adding water constituting 40 wt. % of the formula, and then mixing for 5 minutes. Forming said mixture into 9 mm diameter cylindrical pellets through extrusion with a 6 hole, 2 inch dye and cutting the extruding material to produce pellets with 10 mm approximate length. Drying extruded pellets at a temperature of 110° C. to a moisture content of 3%. The resulting product (Experiment 5 in Table 1) had a Roga index of 85%, thus producing insufficient mechanical strength due to lack of high temperature treatment as described in the prior art for shaped activated carbon pellets with clay binders.

TABLE 1

Summary of Experimental Results

| Experiment | Base Sorbent Surface Area (m$^2$/g) | Base Sorbent Average Pore Size (Å) | Base Sorbent BJH Mesopore Fraction (%) | Roga Index (%) | SO$_2$ adsorption capacity (mg/g) | deNO$_x$ efficiency (%) |
|---|---|---|---|---|---|---|
| 1 | 750 | 22 | 27 | 95 | 90 | 17 |
| 2 | 220 | 32 | 55 | 93 | 14 | 7 |
| 3 | 570 | 20 | 20 | 85 | 47 | NA |
| 4 | 220 | 32 | 55 | 65 | NA | NA |
| 5 | 220 | 32 | 55 | 85 | NA | NA |

Figure 4:
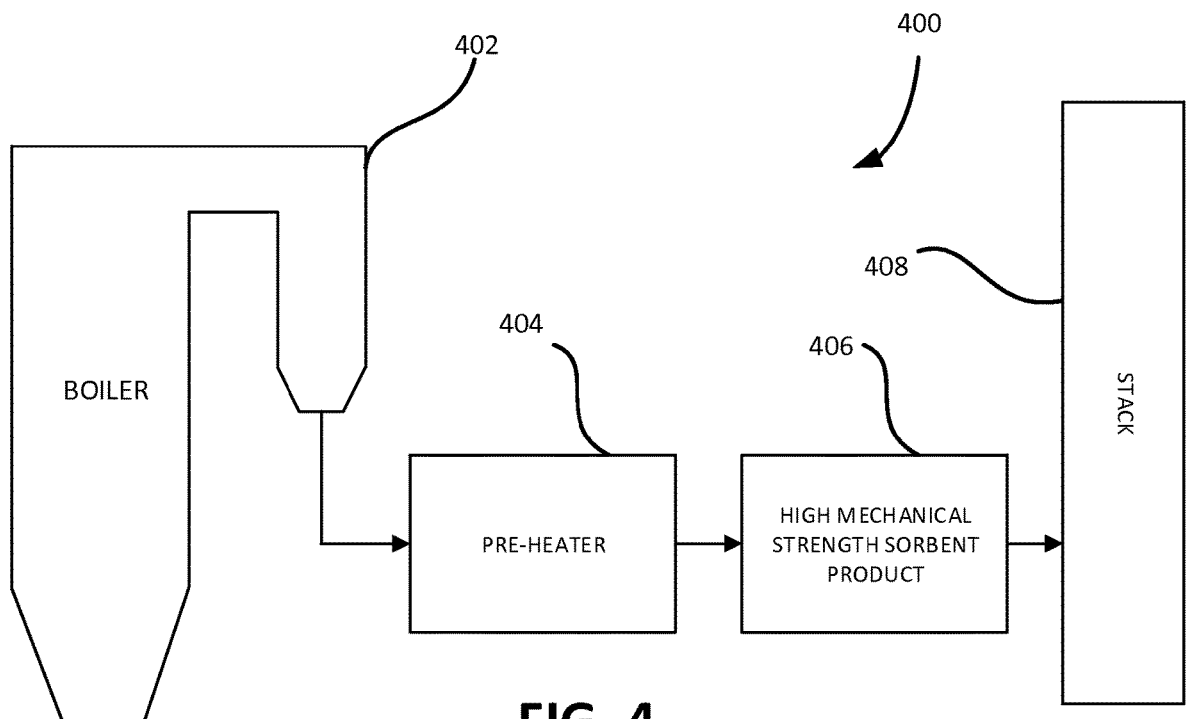
FIG. 4 is a block diagram of a system for controlling multiple pollutants from process gas according to an embodiment.
Figure 5A:
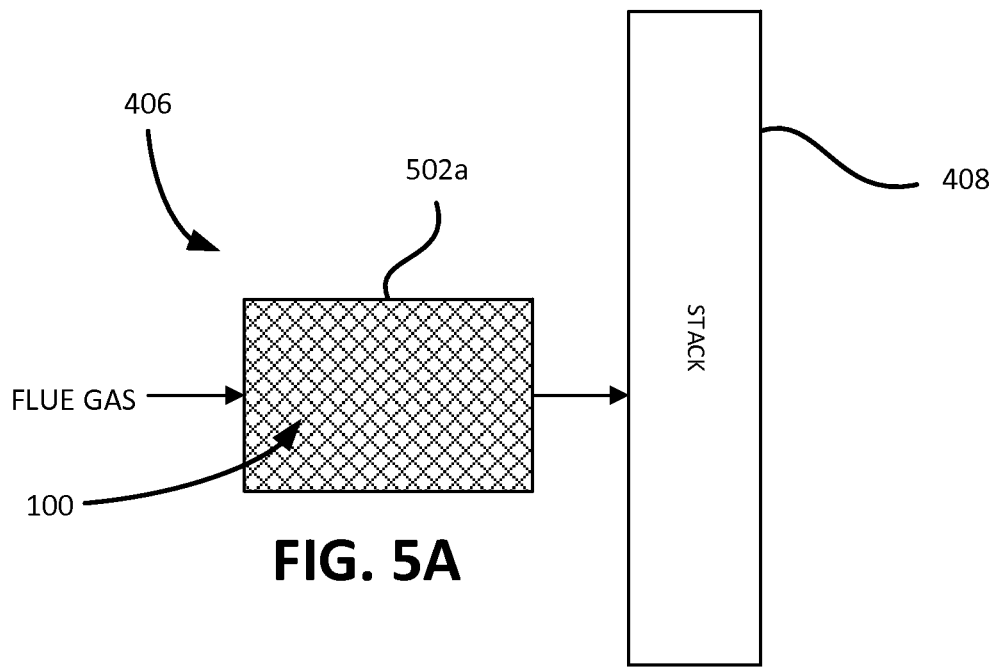
FIG. 5A is an illustration of a packed bed unit containing sorbent products according to an embodiment.
Figure 5B:
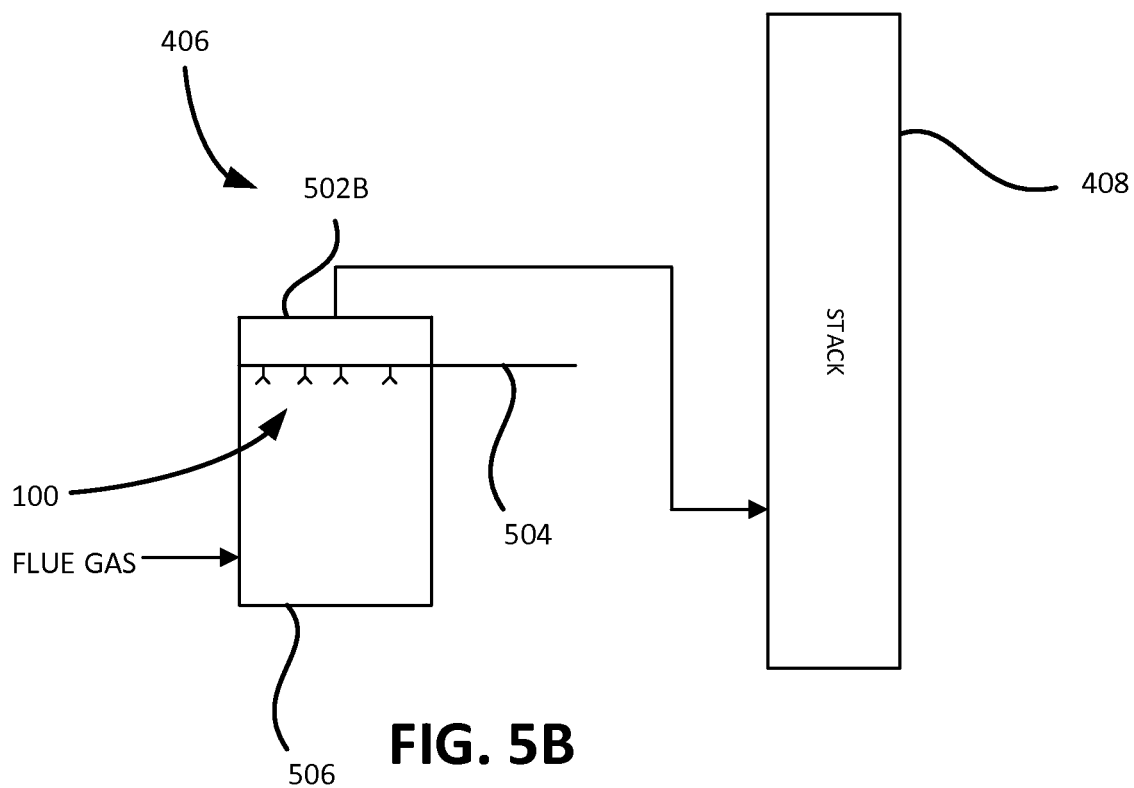
FIG. 5B is an illustration of a direct contact unit containing sorbent products according to an embodiment.
Figure 5C:
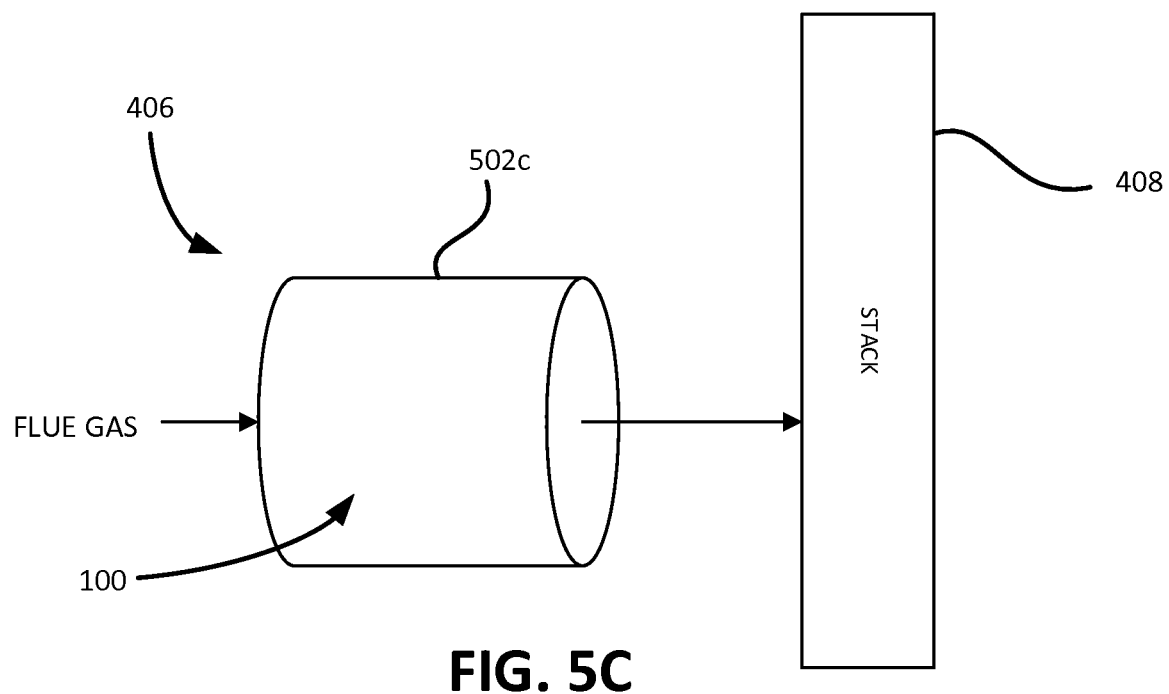
FIG. 5C is an illustration of a rotary contact unit containing sorbent products according to an embodiment.
Figure 5D:
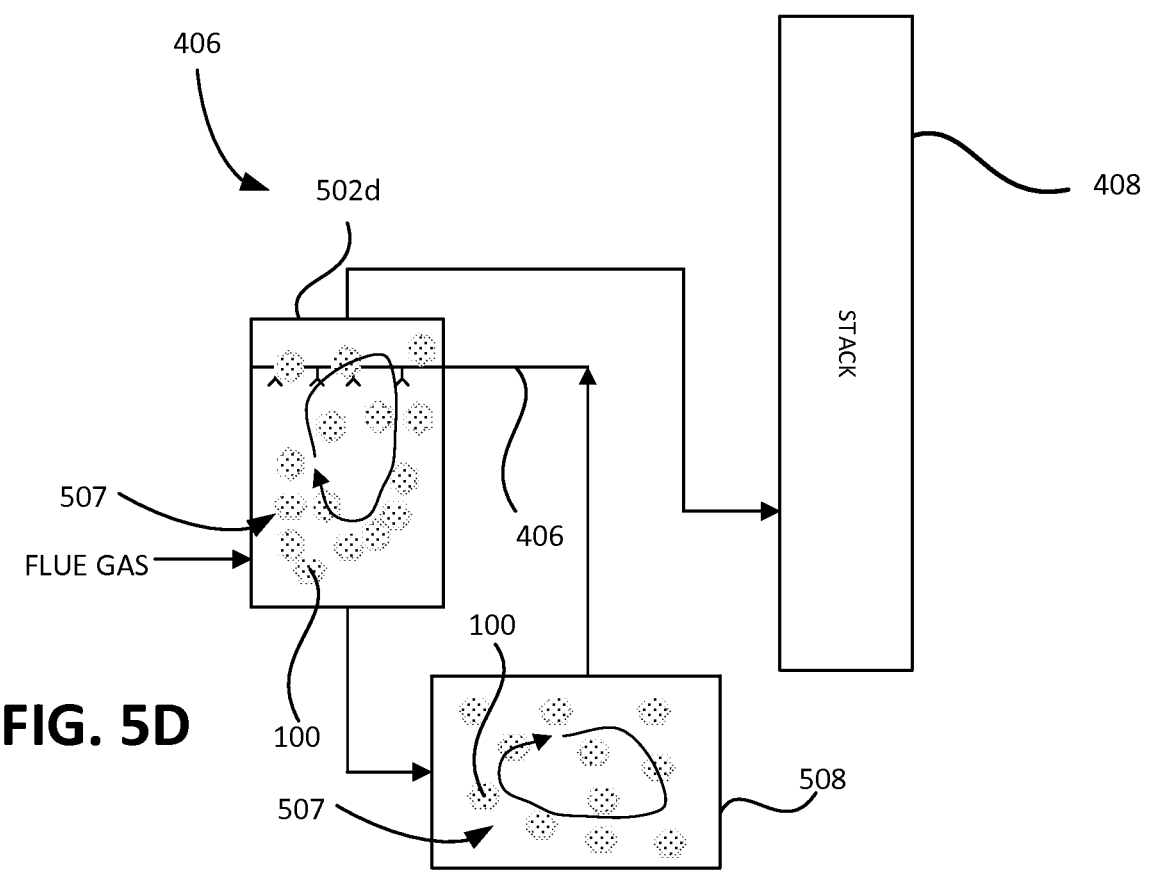
FIG. 5D is an illustration of a recycling unit containing sorbent products according to an embodiment.

Turning now to FIG. 4, an embodiment of a system for controlling multiple pollutants from process gas according to an embodiment is schematically illustrated and generally designated 400. System 400 may include a source of process gas, waste gas, etc. such as a boiler 402 for a coal-fired power plant. Although the example described herein applies to coal-fired power plants, the process gas or flue gas to be treated may originate from many industrial facilities such as a power plant, cement plant, waste incinerator, or other facilities that will occur to one skilled in the art. Such gas streams contain many contaminants that are desirable to decrease in concentration for protection of health and the environment. Nevertheless, the present method is being described for removing sulfur dioxide, sulfur trioxide, mercury, particulate matter and nitrogen oxides from a coal-fired power plant gas stream using the shaped activated carbon pellet. Boiler 402 may be a coal-fired boiler that burns coal to heat water into superheated steam for driving steam turbines that produce electricity. These types of power plants are common throughout the U.S. and elsewhere.

The process gas or flue gas may then be ducted and piped to a heat exchanger or pre-heater 404 where heat is transferred from the flue gas to a feed of air to be fed back into boiler 402. The flue gas may then be transferred to a pollutant control unit 406 for deSO$_x$ control, deNO$_x$ control, and/or Hg removal. After being treated in pollutant control unit 406, the treated flue gas may then be sent to a stack 408 for emission into the environment.

With reference to FIG. 5, pollutant control unit 406 may include many different embodiments that contain sorbent products 100 for controlling deSO$_x$ and deNO$_x$ and/or removing Hg simultaneously in one unit. For example, pollutant control unit 406 may be a packed bed 502a that is packed with sorbent products 100 for passing flue gas through for the simultaneous control of deSO$_x$ and deNO$_x$, and/or removal of Hg. After treatment, the flue gas may then be transferred to stack 408 for emission to the environment.

In another embodiment, pollutant control unit 406 may be a direct contact unit 502b where a supply of sorbent products 100 is injected via a line with nozzles 504 into a vessel 506 where it directly contacts, possibly in a counterflow stream, the stream of flue gas for controlling deSO$_x$ and deNO$_x$ and/or Hg removal. After treatment, the flue gas may then be transferred to stack 408 for emission into the environment.

In yet another embodiment, pollutant control unit 406 may be a rotary contact unit 502c where flue gas is contacted with sorbent products 100 for controlling deSO$_x$ and deNO$_x$ and/or Hg removal. After treatment, the flue gas may be transferred to stack 408 for emission to the environment. In still yet another embodiment, pollutant control unit 406 may be a recycled contact unit 502d having a slow moving bed and/or carousel where the contacted sorbent products 100 is sent to a desorption unit and/or recycle unit 508 where it may be desorbed of the sorbed pollutants prior to being sent back into recycled contact unit 502d.

In this embodiment, recycled contact unit 502d may be any type of vessel or unit that contains a plurality of mobile media 507 that is capable of a fluid type flow (as shown by arrow) within the vessel or unit as is known to those skilled in the art. Mobile media 507 may be treated, coated, and/or have disposed about it or within it the coating or sorbent products 100 as described herein. A process or flue gas is fed through recycled contact unit 502d for contacting with the fluid flowing mobile media 507 having sorbent products 100 and/or coating where the pollutants and/or contaminants contained in the process or flue gas are adsorbed by the mobile media 507. Mobile media 507 may then be transferred to recycle unit 508 where by application of heat or other technology the pollutants and/or contaminants are desorbed from mobile media 507. Mobile media 507 may also have a fluid type flow within recycle unit 508 (as shown by arrow) for improved operation and contact with operating conditions therein. After treatment, the flue gas may be transferred to stack 408 for emission to the environment. Also, the desorbed mobile media 507 may then be recycled back into recycled contact unit 502d for reuse.

Figure 6:
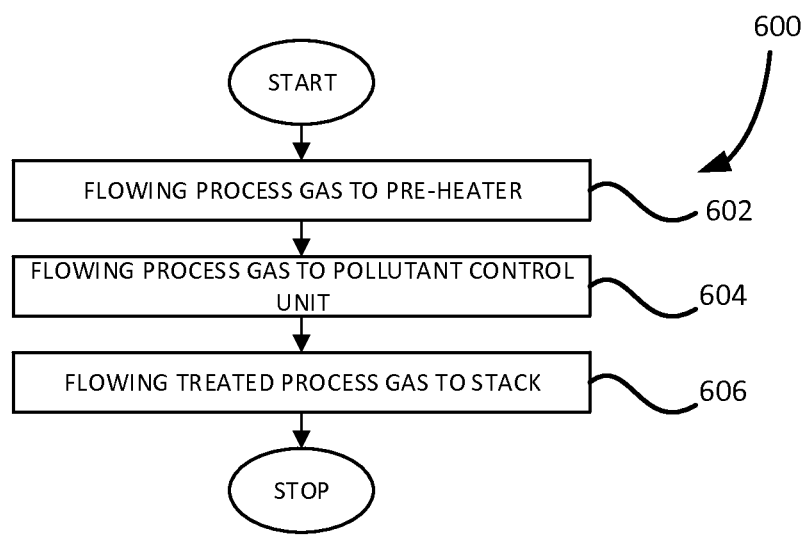
FIG. 6 is a flowchart of a process for controlling multiple pollutants from process gas according to an embodiment.

Turning now to FIG. 6, a method for simultaneously controlling deSO$_x$ and deNO$_x$ and/or Hg removal in flue gas or process gas is schematically illustrated and generally designated 600. In step 602, process or flue gas may be transferred to a pre-heater for heat transfer to an air source to be fed back into a particular unit, such as boiler 402. In step 604, the process or flue gas is transferred to pollutant control unit 406 for simultaneous control of deSO$_x$ and deNO$_x$ and/or Hg removal. This step may include contacting the process or flue gas with sorbent products 100 for controlling deSO$_x$ and deNO$_x$ and/or Hg removal. This step may also include recycling and desorbing nitrogen and sulfur compounds from sorbent products 100. This step may further include flowing or transferring the contacted sorbent products 100 to a desorption unit for desorbing the multiple pollutants from the sorbent products 100. In step 606, the treated process or flue gas may be transferred to stack 408 for emission into the environment.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

The invention claimed is:

1. A method for removing multiple pollutants in a process gas including sulfur oxides, nitrogen oxides, and/or mercury (Hg), said method comprising:
   contacting the process gas with one or more sorbent products, the one or more sorbent products comprising from about 1 wt % to about 99 wt %, based on the total weight of the sorbent products, of at least one base sorbent material; from about 1 wt % to about 99 wt %, based on the total weight of the sorbent products, of at least one binder; and from about 1 wt % to about 5% wt %, based on the total weight of the sorbent product, of at least one additive selected from ammonia salts and metal; and wherein said at least one binder forms a bonded network for supporting said at least one base sorbent material, and wherein said one or more sorbent products does not contain sulfur.

2. The method as recited in claim 1, wherein:
   the one or more sorbent products further comprises: at least from about 0 wt % to about 99% wt %, based on the total weight of the sorbent products, of at least one additional additive.

3. The method as recited in claim 1, wherein:
   the contacting step further includes flowing the process gas through a packed bed of the one or more sorbent products.

4. The method as recited in claim 1, wherein:
   the contacting step further includes injecting the one or more sorbent products into the process gas.

5. The method as recited in claim 1, further comprising:
   desorbing the multiple pollutants from the one or more sorbent products; and
   recycling the one or more sorbent products for contacting the process gas.

6. The method as recited in claim 1, wherein:
   the at least one base sorbent material is at least one material selected from the group consisting of activated carbon, activated coke, activated charcoal, activated carbon fibers, biochars, chars, zeolites and other molecular sieves, silica sorbents, and polymethylsiloxane polyhydrate.

7. The method as recited in claim 1, wherein;
   the at least one base sorbent material has a starting surface area of from about 10 to about 1,500 m$^2$/gram.

8. The method as recited in claim 1, wherein;
   the at least one base sorbent material has an average pore size less than 20.ANG. and less than 50% of the total pore volume is a fraction of mesopores as determined by the BJH method.

9. The method as recited in claim 1, wherein;
   the at least one base sorbent material is from about 15 wt % to about 85 wt %, based on the total weight of the sorbent product.

10. The method as recited in claim 1, wherein;
    the at least one base sorbent material is powdered activated carbon with a starting area of greater than 200 m$^2$/gram.

11. The method as recited in claim 1, wherein;
    the at least one base sorbent material is at least 50 wt % of the total sorbent product.

12. The method as recited in claim 1, wherein;
    the at least one binder is at least one material selected from the group consisting of alumina, aluminates, aluminum, aluminum phosphate, asphalt, attapulgite, bitumen, bentonite clay, borate glass, calcium chromites, calcium compounds, calcium fluoride, calcium germinate, calcium oxide, calcium sulfate, carboxymethlycellulose (CMC), casein, cellulose, cellulose ethers, cement, clay, colloidal silica, epoxy resin, flour, fly ash, fuller's earth, glycerol, guar gum, gums, iron humate, iron oxide, kaolin clay, laponite, lignosulfonates, lime, lime kiln dust, magnesium chloride, magnesium oxide, magnesium sulfate, metal carbides, metal carbonyls, metals, molasses, montmorillonite, natural or synthetic resin, nitrophenols, novalac phenolic resin, organosilicons, phenol resins, phenolic resin polymers, phosphoronitrile dichloride polymers, pickling liquors, pitch, polyacrylonitrile, polyester resins, Portland cement, potassium silicate, pulp mill wastewater, resin, sawdust, shellac, silica, silicates, silicides, silicon carbide, sodium silicate, starch, tar, wollastonite, and zinc compounds.

13. The method as recited in claim 1, wherein;
    the at least one binder comprises: at least one material selected from the group consisting of clays, clay, bentonite clay, attapulgite, fuller's earth, kaolin clay, laponite, and wollastonite; and at least one material selected from the group consisting of colloidal silica, potassium silicate, silica, silicates, silicides, silicon carbide, and sodium silicate.

14. The method as recited in claim 1, wherein;
    the at least one binder is from about 1 wt % to about 50 wt %, based on the total weight of the sorbent product.

15. The method as recited in claim 1, wherein;
    the one or more sorbent products are thermally stable at temperatures up to 450.degree. C. in the presence of water vapor.

16. The method as recited in claim 2, wherein;
    the at least one additional additive is at least one material selected from the group consisting of ammonia chloride, ammonia sulfate, urea, acid, base, nitric acid, iron oxides, complex metal ions, Fe-EDTA, iron hydroxides, metal oxide, alkaline earth metal, and sand.

\* \* \* \* \*